G. A. H. KELLNER.
LENS CENTERING AND MEASURING INSTRUMENT.
APPLICATION FILED JULY 14, 1916.

1,204,030. Patented Nov. 7, 1916.

WITNESSES:
Walter B. Payne
Nelson H. Copp

INVENTOR
Gustav A. H. Kellner
BY
his ATTORNEYS

UNITED STATES PATENT OFFICE.

GUSTAV A. H. KELLNER, OF ROCHESTER, NEW YORK, ASSIGNOR TO BAUSCH & LOMB OPTICAL COMPANY, OF ROCHESTER, NEW YORK, A CORPORATION OF NEW YORK.

LENS CENTERING AND MEASURING INSTRUMENT.

1,204,030.      Specification of Letters Patent.      Patented Nov. 7, 1916.

Application filed July 14, 1916. Serial No. 109,253.

*To all whom it may concern:*

Be it known that I, GUSTAV A. H. KELLNER, of Rochester, in the county of Monroe and State of New York, have invented certain new and useful Improvements in Lens Centering and Measuring Instruments; and I do hereby declare the following to be a full, clear, and exact description of the same, reference being had to the accompanying drawings, forming a part of this specification, and to the reference-numerals marked thereon.

My present invention has as its object to provide an optical apparatus to be used for centering and measuring lenses, and adapted particularly to facilitate the marking of the centers and surfaces of lenses and in addition to an observing telescope it comprehends an improved form of target comprising a real or fiducial line and means for producing an image of a second intersecting line, both of which parts are adjustable, whereby they may be brought into the foci of the lenses which are to be marked, so that observation of the latter through the telescope will enable the operator to determine when a lens is accurately centered with respect to said lines, the latter constituting the cross-hairs of the instrument.

To these and other ends the invention consists in certain improvements and combinations of parts, all as will be hereinafter more fully described, the novel features being pointed out in the claims at the end of the specification.

Figure 1:
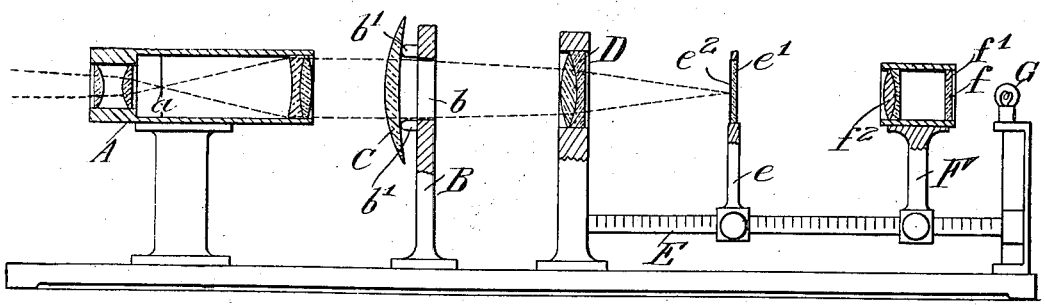
Figure 2:
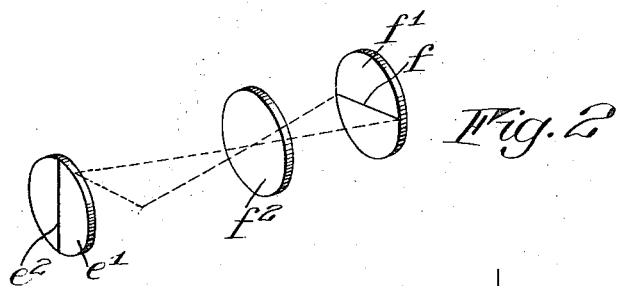
Figure 3:
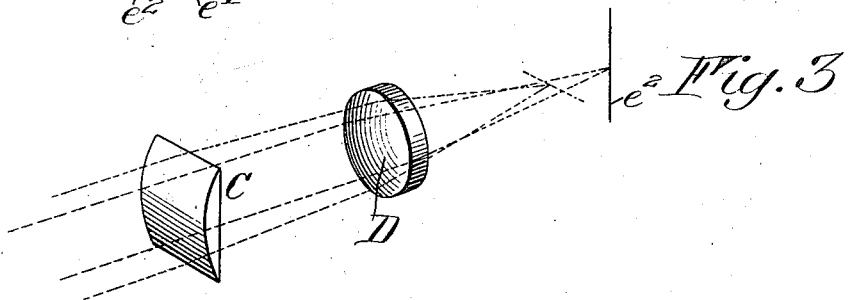
Figure 4:
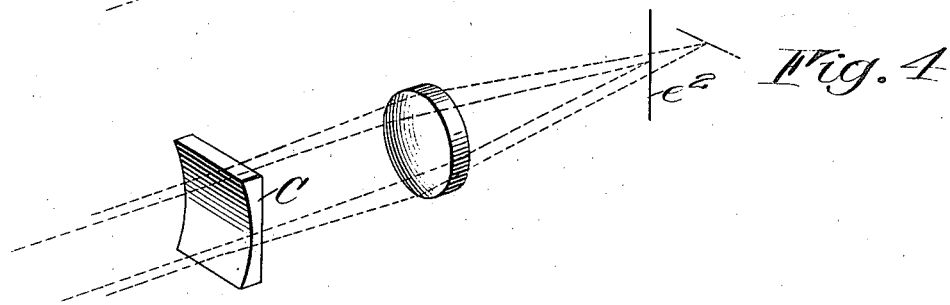

In the drawings: Figure 1 is a diagrammatic illustration showing one embodiment of the parts of an instrument constructed in accordance with my present invention; Fig. 2 is a diagrammatic perspective view showing the formation of the image of the second line of the target; Figs. 3 and 4 are diagrammatic perspective views showing relative positions of the target or cross-hair lines with respect to each other and with relation to lenses to be marked, one being a positive lens and the other a negative lens.

Similar reference numerals in the several figures indicate similar parts.

In illustrating my present invention I have shown an instrument comprising an observing telescope, indicated by A, which may be of any desired or special construction, the lenses of which are set to focus an infinitely far object and having therein a set of cross-hairs at about the point indicated by $a$. In front of the telescope is positioned an upright B, having an aperture $b$, provided on its forward edge with a plurality of projections or studs $b'$ and comprising a locating member against which the lens to be marked is placed and held by the operator, the lens, in Fig. 1, being indicated by C.

In rear of the lens locating member is the standard lens D mounted in fixed position in the axis of the telescope A and of such form that images of the two adjustable parts of the target will be focused into the respective foci of the different meridians of a lens when it is placed against the locating member B.

In an optical instrument of this character, used for measuring and centering lenses, it is not desirable to have the two lines forming the inter-secting cross-hairs fixed, because in measuring astigmatic lenses (lenses with different power in two meridians 90° apart) it is impossible to simultaneously bring in focus the two arms or lines of the cross-hairs and the definition of one of the latter not being sharp adds to the difficulty in accurately determining the optical center of the lens. In order to overcome this difficulty, and to obtain other advantages, I provide a target which may be said generally to consist of a fiducial line, forming one of a pair of cross-hairs, and an image of the line forming the second line or bar of the pair of cross-hairs. This image of the second line which coöperates with the fiducial line is formed optically by means carried on a separate support independent of the support which carries the fiducial line. By this arrangement of the parts there is provided at one point on the optical axis of the instrument a real observation line and at another point in said axis, either in front of or behind said real line is an image of a second line.

Both the real line and the means for forming the image of the second line are adjustable relatively to each other and to the standard lens D, which adequately accommodates the instrument for use in measuring and marking both positive and negative astigmatic lenses. In carrying out this feature of my invention I arrange upon a horizontal guide rail or bar E an arm or bracket $e$, carrying either an aperture provided with a transversely extending wire, or thread, or an optically plane glass $e'$, provided with a line $e^2$, which may extend either horizontally or vertically. This wire, or line, constitutes one of a pair of lines which, when viewed through the telescope A appears as a set of cross-hairs and for facility in description I shall term this the fiducial line. Also mounted on a rail or bar E in rear of the bracket $e$ is a similar bracket F carrying, in axial alinement with the other parts of the instrument, a wire $f$, or a line marked on one of the faces of an optically plane glass disk $f'$, and disposed at right angles to the plane of the fiducial line $e^2$. Also mounted on the bracket F in front of the wire or line $f$ is a lens $f^2$, which receiving the rays of light from a lamp or other light source G produces an image of the wire or line $f$ in the axis of the instrument. By adjusting the bracket F along the bar E the image of the wire, or line $f$, may be made to appear in front of the fiducial line $e^2$, to exactly co-incide therewith, or to appear in rear of said line. In Fig. 3 the image is shown in the axis of the instrument at the forward side of the fiducial line and in Fig. 4 it is shown in rear of it. The bar E may be provided with suitable scale indications from which the operator may determine the power of the two meridians of a lens under observation.

When the fiducial or real observation line of the target and the image of the coöperating intersecting line are properly adjusted by the operator, viewing them through the telescope A and the lens C which is to be marked, the image of the real or fiducial line and that of the image of the second line will be positioned or focused by the standard lens D in the foci of the lens C and after this focusing operation is completed, the operator by shifting the lens C will be able to accurately determine whether or not said lens is properly positioned on its locating or supporting member by merely observing whether or not there is coincidence between the cross-hairs of the target and the lines of the cross-hairs located at point $a$ in the telescope A. When this coincidence appears to take place a lens is properly positioned to be marked and this part of the operation may be performed by any of the well-known devices used for this purpose which have for this reason been omitted from the present illustrations.

I claim as my invention:

1. A lens centering instrument comprising an observing telescope, a support for a lens to be marked and a target focusing lens coöperating therewith, of a real target member and means for producing an image target, said real target and image target means being adjustable relatively toward and from each other and the support for the lens to be marked.

2. A lens centering instrument comprising a locating member for a lens to be marked, an observing telescope at one side of the member, a support having a fiducial line located at the other side of the member and intersecting the optical axis of the telescope, means for producing an image of a second line intersecting the axial plane of the fiducial line and a lens located to focus in the respective foci of the lens to be marked images of the fiducial line and the image of the intersecting line.

3. A lens centering instrument comprising a locating member for a lens to be marked, an observing telescope at one side of the locating member, a support at the other side thereof carrying a fiducial line and adjustable to move said line longitudinally in the optical axis of the instrument, a second adjustable support, means carried thereon for forming in said axis an image of a line intersecting the fiducial line and a lens positioned to focus into the respective foci of the lens to be marked images of the fiducial line and the image of the intersecting line.

4. A target for use in measuring or centering lenses, or the like, comprising a fiducial line forming one of a pair of cross-hairs and means for producing an image of the line forming the second cross-hair, said means being adjustable to vary the position of the line image relatively to the fiducial line.

5. A target for use in measuring or centering lenses, or the like, comprising one line of a pair of cross-hairs supported to give a real observation line, and means for producing an image of a line at an angle to the real observation line, the latter and the image being disposed for view one behind the other.

6. A target for use in measuring or centering lenses, or the like, comprising a support provided with one of the two lines of a pair of cross-hairs and a second support carrying the other cross-hair line and provided with a lens for forming an image thereof at one side of the first mentioned line, the second support being adjustable toward and from the first mentioned support.

GUSTAV A. H. KELLNER.